(12) United States Patent
Budd et al.

(10) Patent No.: US 6,222,677 B1
(45) Date of Patent: Apr. 24, 2001

(54) COMPACT OPTICAL SYSTEM FOR USE IN VIRTUAL DISPLAY APPLICATIONS

(75) Inventors: Russell A. Budd, North Salem; Derek B. Dove, Mount Kisco, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/437,972

(22) Filed: Nov. 10, 1999

Related U.S. Application Data

(60) Provisional application No. 60/128,899, filed on Apr. 12, 1999.

(51) Int. Cl.[7] .............................. G02B 27/14; G02B 27/12
(52) U.S. Cl. ............................ 359/630; 633/638; 633/639
(58) Field of Search .................................. 359/630, 631, 359/633, 638, 639, 640, 637; 345/7, 8, 9

(56) References Cited

U.S. PATENT DOCUMENTS

| | | | |
|---|---|---|---|
| 5,757,339 | 5/1998 | Williams et al. | 345/8 |
| 5,771,124 | 6/1998 | Kintz et al. | 359/633 |
| 5,844,656 | 12/1998 | Ronzani et al. | 351/158 |
| 5,943,171 * | 8/1999 | Budd et al. | 359/631 |
| 6,005,720 * | 12/1999 | Watters et al. | 359/630 |
| 6,101,028 * | 8/2000 | Heacock et al. | 359/368 |

* cited by examiner

*Primary Examiner*—Georgia Epps
*Assistant Examiner*—Saeed Seyrafi
(74) *Attorney, Agent, or Firm*—Ryan, Mason & Lewis, LLP; Yoshihiro Ichii

(57) ABSTRACT

The invention provides a newly designed head mounted virtual image display that is dramatically less in weight than is known in the art by virtue of a unique beam folding design, making possible wearable computer systems of significantly greater convenience and acceptability to a wide range of users. The unit may be used comfortably in conjunction with eyeglasses. Optical systems according to the invention are provided that are advantageous for use with emissive, transmissive and reflective microdisplays, and which provide high optical performance, compact design and clear see-through properties. Also, the invention provides an improved method of illumination for reflection liquid crystal microdisplays. This makes possible optical systems for virtual image displays of improved field of view, compactness, and shorter image path combined with good efficiency.

30 Claims, 14 Drawing Sheets

COMPACT OPTICAL SYSTEM FOR USE IN VIRTUAL DISPLAY APPLICATIONS

CROSS REFERENCE TO RELATED APPLICATIONS

The present application claims priority to provisional U.S. patent application Ser. No. 60/128,899, filed Apr. 12, 1999, in the names of R. Budd and D. Dove, entitled "Compact Optical Designs for Virtual Display Applications and Head Mounted Displays," the disclosure of which is incorporated herein by reference, and is also related to U.S. patent application application Ser. No. 09/437,793, in the names of R. Budd and D. Dove, entitled "Compact Illumination System Providing Improved Field of View for Virtual Display Applications," filed concurrently herewith, the disclosure of which is incorporated herein by reference.

FIELD OF THE INVENTION

The present invention relates generally to compact optical systems and, more particularly, to compact optical systems for use in display devices, for example, personal devices such as wearable personal computer systems, head mounted displays, portable telephones and the like.

BACKGROUND OF THE INVENTION

Virtual image displays combine magnifying optics with a small image panel to provide the viewer with a virtual image capable of displaying large amounts of information. Such displays have found application in so called head mounted displays and are used in conjunction with a computer-based device for a variety of applications. As is known, the computer-based device includes processing and display driver circuitry for generating the image signal to be displayed via the optics and image panel.

However, such conventional virtual image displays are known to have many shortcomings. For example, such displays have suffered from being too heavy for comfortable use, as well as too large so as to be obtrusive, distracting, and even disorienting. These defects stem from, among other things, the incorporation of relatively large optics systems within the mounting structures, as well as physical designs which fail to adequately take into account such important human factors as size, shape, weight, etc.

Examples of some conventional head mounted virtual displays are shown in FIGS. 1 and 2. FIG. 1 illustrates a head mounted virtual display unit 10 which rests on the users head and face in a manner similar to that of a pair of eye glasses. The user views virtual images through the display portion 12. Nose bridge 14 and side supports 16 serve to provide support for the display while on the users head and face. The unit 10 may be connected to a computer via connector 18. It is known that such a unit is cumbersome and permits the wearer to see substantially nothing other than the display screen. That is, the user is unable to view his immediate environment. Such a head mounted virtual display is disclosed in an international patent application identified as WO 95/11473, the disclosure of which is incorporated herein by reference.

FIG. 2 illustrates a head mounted monocular virtual display unit 20. The support structure 12 is positioned on a users head and the display portion 14 comes down in the users field of vision. This design is also known to be cumbersome and likely to obstruct the users surrounding view. Such a head mounted monocular virtual display is also disclosed in a the international patent application identified as WO 95/11473.

Other examples of conventional compact display systems and head mounted displays are disclosed in U.S. Pat. No. 5,771,124 to Kintz et al., U.S. Pat. No. 5,757,339 to Williams et al., and U.S. Pat. No. 5,844,656 to Ronzani et al., the disclosures of which are incorporated herein by reference. Still further, it is known that Sony Corporation makes a head mounted virtual display known as the "Glasstron."

However, all of the examples given suffer from one or more of the above-mentioned design deficiencies. As a result, such deficiencies have seriously hindered the general acceptance of such devices.

Accordingly, there is a need for a compact optical system for use in display devices, for example, personal devices such as wearable personal computers, head mounted displays, portable telephones and the like, which substantially reduces or eliminates these and other deficiencies.

SUMMARY OF THE INVENTION

The present invention provides various optical system designs for use in display devices such as, for example, a head mounted virtual image display, that remedy defects exhibited by conventional designs, e.g., prohibitive size and weight, obstructed view, etc. The optical system is very compact and light weight so that, combined with a head mounted support structure to hold the display in proximity to the eye, a weight on the order of only 1 to 2 ounces may be achieved. Such a display is achieved with excellent optical properties. One particular advantageous feature of the invention is that a given field of view may be obtained with a relatively small thickness associated with the optical system, resulting in light weight and small volume. Combined with a light weight computer-based device, this display device makes possible a uniquely portable and convenient wearable computing system.

In one aspect of the invention, a compact optical system for directing an image signal for viewing by a user, the image signal being generated in accordance with a microdisplay, comprises: (i) a first prism positioned proximate to the microdisplay; (ii) a quarter wave plate positioned proximate to the first prism; (iii) a reflective lens positioned proximate to the quarter wave plate; and (iv) a second prism positioned proximate to the first prism; wherein the first prism, the quarter wave plate, the reflective lens, and the second prism are arranged such that the image signal enters the first prism, reflects at an air gap between the first prism and the quarter wave plate, reflects at a boundary between the first prism and the second prism, passes through the quarter wave plate a first time, reflects at the reflective lens, passes through the quarter wave plate a second time, passes through the boundary between the first prism and the second prism, and exits the second prism for viewing by the user.

Preferably, the boundary between the first prism and the second prism is configured to reflect polarized light associated with the image signal generated by the microdisplay. For example, the boundary may include a multilayer reflective coating or a DBEF film. Further, the reflective lens preferably includes a convex-shaped surface facing the quarter wave plate. The reflective lens may include a reflective coating such as, for example, a fully reflecting metallic coating, a fully reflecting multilayer dielectric coating, a partially reflecting coating, or a holographic coating. Still further, the reflective coating preferably has a predetermined wavelength associated therewith for permitting substantial reflection of the image signal and substantial transmission of one or more other images, e.g., such as images on the other side of the reflective lens, that is, the side opposite the side facing the user. In this manner, the user may view the image signal but substantially see-through the optical system to the surrounding environment.

Various alternative embodiments of the invention are provided for use in accordance with transmissive, emissive, and/or reflective type microdisplays.

In another aspect of the invention, a head mounted virtual image display unit comprises: (a) a microdisplay; (b) an optical system for directing an image signal for viewing by a user, the image signal being generated in accordance with the microdisplay, the optical system including: (i) a first prism positioned proximate to the microdisplay; (ii) a quarter wave plate positioned proximate to the first prism; (iii) a reflective lens positioned proximate to the quarter wave plate; and (iv) a second prism positioned proximate to the first prism, wherein the first prism, the quarter wave plate, the reflective lens, and the second prism are arranged such that the image signal enters the first prism, reflects at an air gap between the first prism and the quarter wave plate, reflects at a boundary between the first prism and the second prism, passes through the quarter wave plate a first time, reflects at the reflective lens, passes through the quarter wave plate a second time, passes through the boundary between the first prism and the second prism, and exits the second prism for viewing by the user; and (c) an optical system mounting structure for supporting the optical system within the field of view of an eye of the user. Preferably, the mounting structure is configured to permit the optical system to be selectively moved into and out of the field of view of the eye of the user.

In yet another aspect of the invention, a portable computer system comprises: (1) a head mounted virtual image display unit, the unit including: (a) a microdisplay; (b) an optical system for directing an image signal for viewing by a user, the image signal being generated in accordance with the microdisplay, the optical system including: (i) a first prism positioned proximate to the microdisplay; (ii) a quarter wave plate positioned proximate to the first prism; (iii) a reflective lens positioned proximate to the quarter wave plate; and (iv) a second prism positioned proximate to the first prism, wherein the first prism, the quarter wave plate, the reflective lens, and the second prism are arranged such that the image signal enters the first prism, reflects at an air gap between the first prism and the quarter wave plate, reflects at a boundary between the first prism and the second prism, passes through the quarter wave plate a first time, reflects at the reflective lens, passes through the quarter wave plate a second time, passes through the boundary between the first prism and the second prism, and exits the second prism for viewing by the user; and (c) an optical system mounting structure for supporting the optical system and microdisplay within the field of view of an eye of the user; and (2) a computer-based device, coupled to the head mounted virtual image display unit, for generating and providing an electrical signal to the microdisplay for use in generating the image signal to be viewed by the user.

In a further aspect of the invention, an improved illumination system for virtual image displays employing reflective liquid crystal microdisplays is provided. Particularly, the functions of the illumination system are to: (i) provide focusing and dispersion of the light source, polarization of the light beam incident on the reflective microdisplay; (ii) provide a path for light reflected from the microdisplay to enter the image forming optics; and (iii) maintain efficient use of the amount of available light. The inventive illumination method has the property of providing a short imaging path, while still ensuring efficiency and polarization quality. This is particularly advantageous for the design of compact virtual image displays.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Various optical system designs of the present invention will be explained below in the context a head mounted virtual display unit and wearable computer. However, it is to be understood that the present invention is not limited to this or any particular display application. Rather, the invention is more generally applicable to any suitable display application in which it is desirable to utilize a compact optical system for displaying images which may be incorporated into a device used in the application. Such devices may be, for example, personal devices such as wearable personal computers, head mounted displays, portable telephones and the like.

Figure 1:
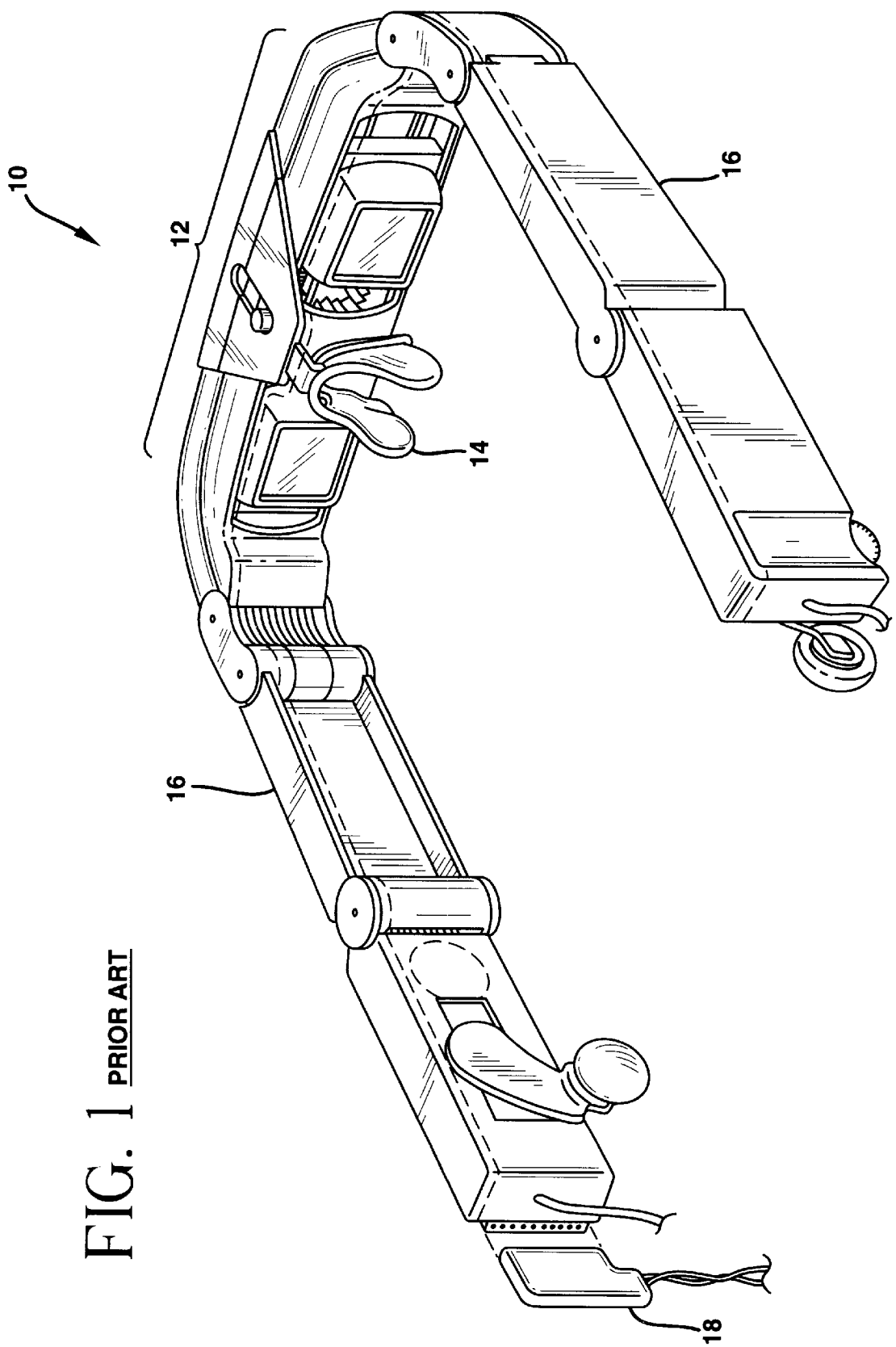
FIG. 1 illustrates a conventional eye glass type head mounted virtual display.
Figure 2:
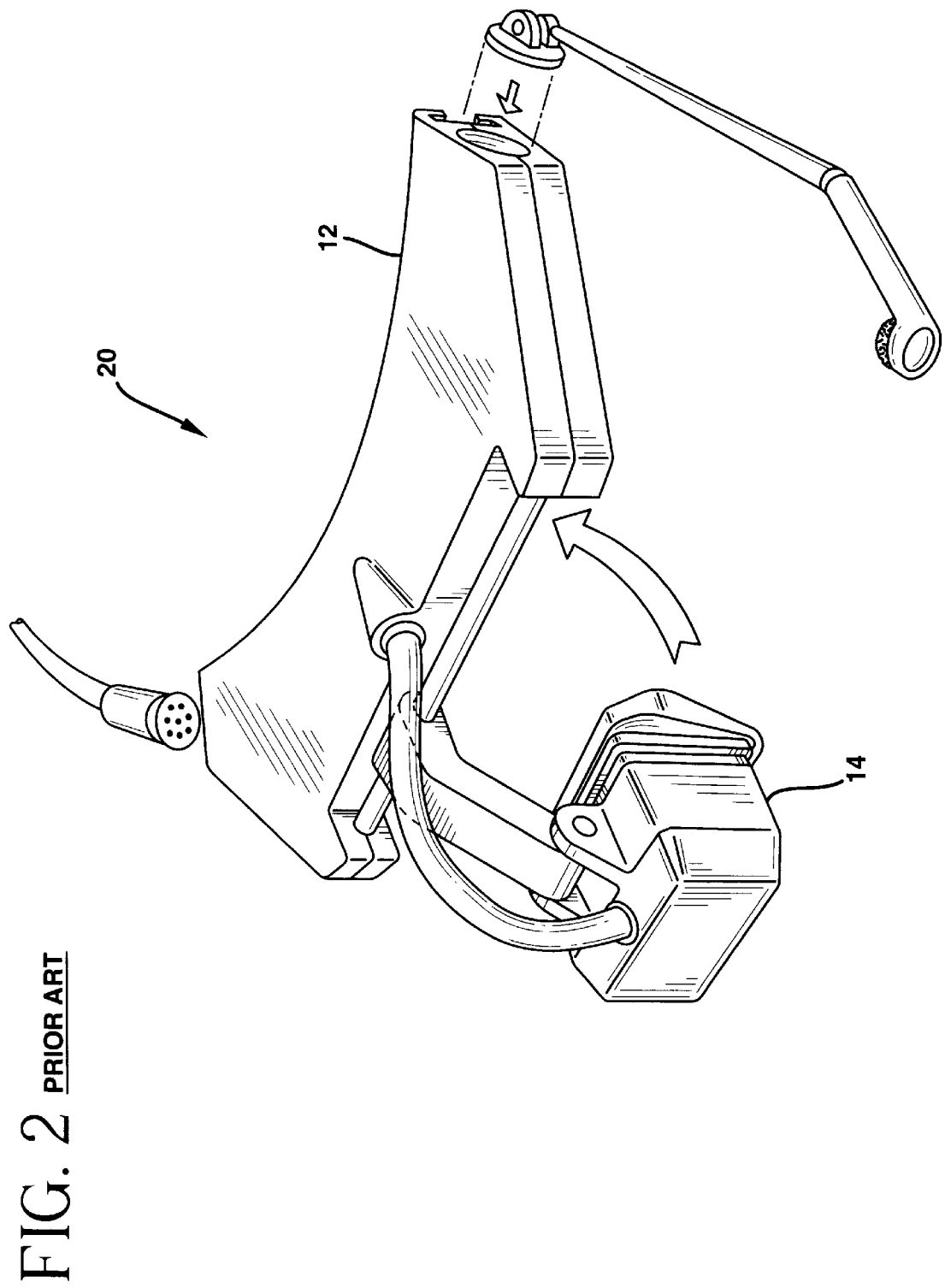
FIG. 2 illustrates a conventional monocular type head mounted virtual display.
Figure 3A:
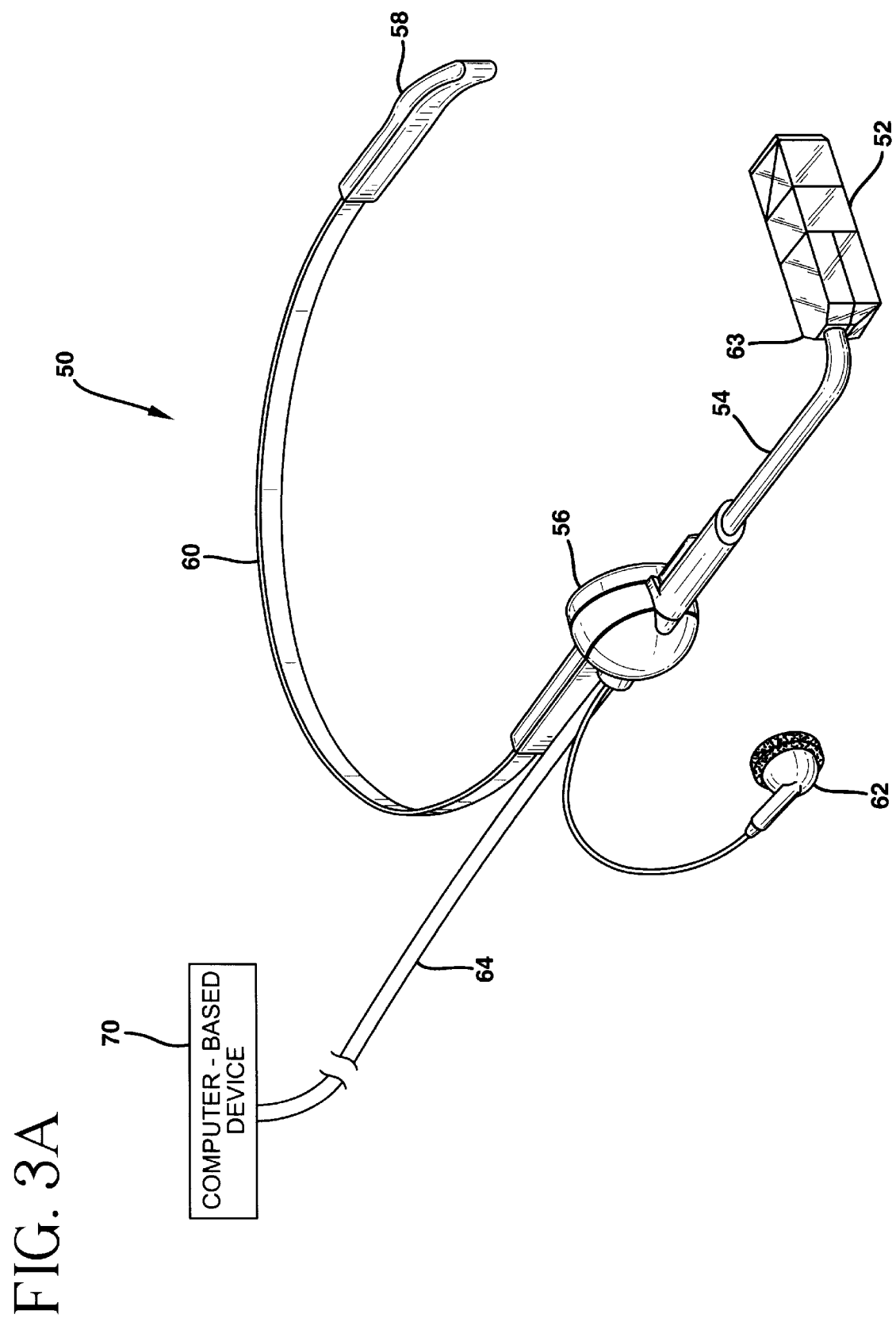
FIG. 3A illustrates a head mounted virtual display unit and computer-based device according to one embodiment of the present invention.

Referring initially to FIG. 3A, a head mounted virtual display unit 50 and computer-based device 70 according to one embodiment of the present invention are shown. It is to be understood that the computer-based device 70 preferably has a small form factor, e.g., pocket-sized, and is lightweight. It may also preferably have a clip for attachment to a user's belt or pocket. Such a computer-based device is referred to as a "wearable computer." The wearable computer may include all or most of the typical components available in a personal computer, laptop computer, personal digital assistant or the like, e.g., a processor (e.g., CPU), fixed memory, removable memory, display driver circuitry, external network (e.g., Internet) connection device, application software, etc.

The head mounted virtual display unit 50 includes: a display portion 52; an adjustable boom 54; head supports 56 and 58 for the right side and left side, respectively, of a wearer's head; a head band 60 that wraps around the back of the wearer's head; an earpiece 62, and a cable 64 for electrically coupling the computer-based device 70 with the head mounted virtual display unit 50. The unit 50 may also include a built-in microphone 63. The display portion 52 of the unit 50 is where a compact optical system of the invention, as will be explained, is contained. The display portion 52 is capable of pivoting via the boom 54 and head support 56. In this manner, the user may move the display portion 52 into and out of the field of view of, in this case, his right eye. Of course, the unit 50 may be configured such that the display portion 52 is viewed by a wearer's left eye. In such case, the unit 50 can be turned over to be used by the left eye. Also, the unit 50 may be configured to include two separate display portions, that is, one for the right eye and one for the left eye. One or ordinary skill in the art will realize other configurations.

Thus, the combination of the display unit 50 and the computer-based device 70 permits a user to view visual data generated in accordance with the device 70, e.g., from application software, web browser, etc. The visual information is provided to the display via cable 64. The earpiece 62 permits a user to listen to audio data generated in accordance with the device 70. The microphone 63 permits a user to input voice commands to the computer.

Figure 3B:
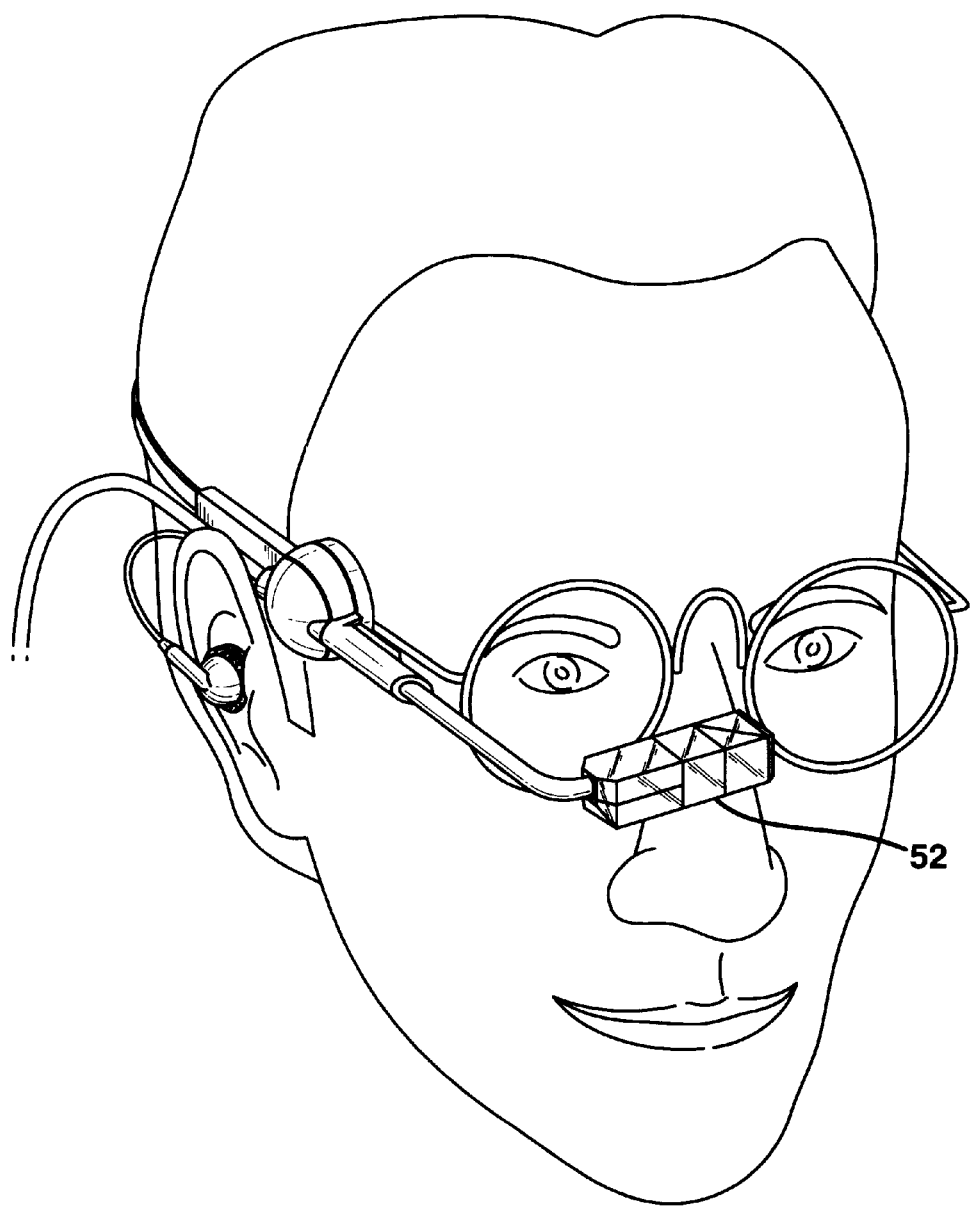
FIG. 3B illustrates an artistic rendering of a head mounted virtual display unit according to the present invention as may be worn by a user.

Accordingly, FIG. 3A illustrates a light weight wearable computer system comprising a light weight head mounted display unit containing a compact optical system used in conjunction with a pocket sized, wearable computer. Since the optical system is attached to the user's head by means of a light weight boom or band structure, such as shown, this enables a total head mounted display weight of approximately two ounces or less to be achieved. This design is versatile and may be worn over eyeglasses if desired. FIG. 3B illustrates an artistic rendering of a head mounted virtual display unit according to the present invention as may be worn by a user. As shown, the display portion 52 may be advantageously moved into the field of view of the user's right eye or left eye. It is small so as to be unobtrusive and allows an undistorted view through the optical system to the outside world. When the display is turned on, there is enough light that the display can be seen clearly against the surroundings. In extremely bright conditions, a shutter against external light may be incorporated.

Various optical systems according to the present invention for use in the display portion 52 will now be described. It is to be understood, however, that these inventive optical system designs may be used in accordance with devices other than the wearable computer system illustrated in FIG. 3A. Given their compact form factors and ability to display high quality optical images, the various optical systems of the invention are suitable for a vast number of applications. One of ordinary skill in the art will realize various other implementations and applications with which such inventive optical systems may be employed.

Further, as will be explained in detail in connection with the various embodiments, the optical systems of the invention provide optics with folded light paths which are "onaxis" optics rather than "free form" optics. In this manner, the optical system is able to provide the advantages and features described herein, as well as others that one or ordinary skill in the art will realize given the inventive teachings herein. It is to be appreciated that by the terms "on-axis" and "free form," we mean the following. A ray going through a typical spherical lens that is normal to the lens and passes through its center, defines the optical axis. The bundle of rays passes through the lens cluster about this axis and may be well imaged by the lens. Examples of systems might be a camera, microscope, binoculars. In more complex systems, the bundle of rays may cluster about a line tilted with respect to the lens; this would be "off-axis" imaging. Note, the typical spherical lens is symmetric about the optic axis. Yet other systems are not radially symmetric and do not have a clear optical axis as defined above, yet may still perform an imaging function. We generally call them "free form" optics.

Figure 4:
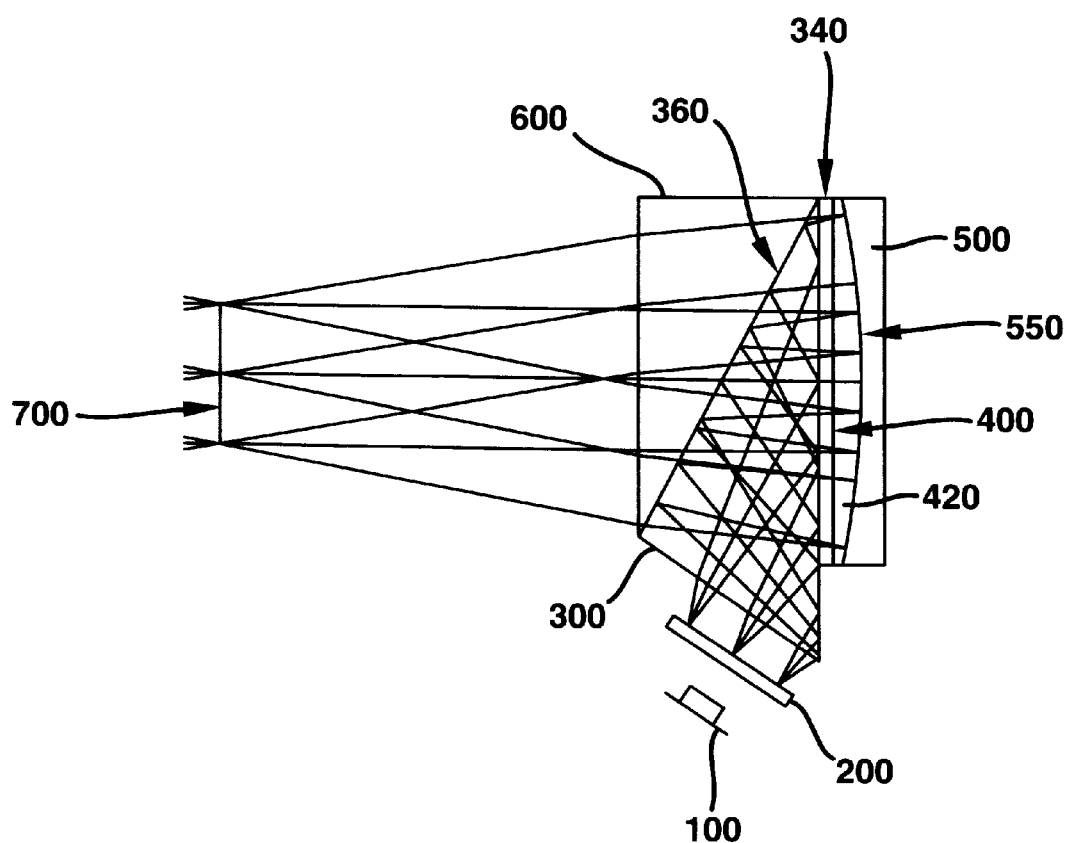
FIG. 4 illustrates a virtual display optical system according to a first embodiment of the present invention.

Referring now to FIG. 4, a virtual display optical system according to a first embodiment of the present invention is shown. Light from a light source 100, typically a cluster of red, green and blue light emitting diodes (LEDs), illuminates a microdisplay 200. In this embodiment, the microdisplay is a transmissive type microdisplay. Transmissive microdisplays that may be used in accordance with the invention are available, for example, from Kopin of Taunton, Mass. It is to be appreciated that the transmissive microdisplay may be replaced with an emissive microdisplay wherein the light source is internal to the microdisplay. Emissive microdisplays that may be used in accordance with the invention are available, for example, from Planar of Beaverton, Oreg. Also, as will be shown, the microdisplay may be a reflective type microdisplay. In any case, as is well known, the microdisplay creates an image in response to electrical signals applied to the display. The electrical signals may, for example, be provided to the microdisplay from the computer-based device 70 (FIG. 3A). This image is viewed by a user by means of a first prism 300, a reflective lens 500 and a second prism 600.

Light from the display is polarized and enters the first prism 300 and is reflected at an air gap 340 between the prism 300 and a quarter wave plate 400. The reflected beam undergoes a second reflection at a boundary 360 between the first prism 300 and the second prism 600. This boundary preferably carries a multilayer reflective coating that reflects light of so called s polarization arising from the microdisplay, through the quarter wave plate 400 into a reflective lens 500. As shown, a glass piece or lens 420 separates the quarter wave plate 400 and the reflective lens 500. The multilayer reflective coating 360 may, for example, be a DBEF film made by 3M Company of St. Paul, Minn. DBEF stands for Dual Brightness Enhancement Film. Also, a thin film dielectric layer stack may be employed as the multilayer reflective coating 360.

The reflective lens 500 may, for example as will be explained, be a reflector having high reflectivity at specific wavelengths, a holographic reflector, a mirror or a partial mirror. In any case, the reflective lens 500 has a reflective coating 550 at its curved surface that reflects light back through the quarter wave plate 400 into the prism 300. The action of two passes through the quarter wave plate is to convert the direction of polarization from s top, in which case the beam traverses the coating 360 and enters the viewers eye 700. It is to be appreciated that compactness of the optical system is advantageously achieved by means of the several folds incorporated into the light path.

It is to be understood that the reflective lens coating 550 may consist of a fully reflecting metallic or multilayer dielectric coating, or a partially reflecting coating which permits the viewer to also see through the unit. The reflecting layer may also be of a type that has a specific wavelength selectivity to enhance the see-through or transparency capability, while at the same time reflecting light of the desired wavelength or group of wavelengths toward the eye. This is advantageous when the light source consists of relatively narrow band red, green and blue wavelengths as, for example, is the case with LEDs. For example, known wavelengths are 625, 525 and 460 nanometers for red, green and blue light, respectively. This is the case in a preferred embodiment where a colored image is achieved at the eye by sending red, green and blue images in close succession (referred to as the color sequential method) through the optical system such that the average effect perceived by the viewer is one of a normal colored image. This is achieved by pulsing on the red, green and blue light sources in succession in phase with images consisting of red, green and blue image components being applied in turn to the microdisplay, as is known in the art. It is also to be appreciated that the mirror lens 500 may have a holographic or other coating the achieves the reflectivity desired.

Advantageously, it is a feature of this optical system design of the invention that the eye, in looking through the optical system to the outside world, does not see a distorted view. This is advantageously achieved in accordance with the above-explained design by shaping the entry surface of the second prism 600 and the exit surface behind the mirror reflective lens 500. For example, as shown in FIG. 4, the exterior surfaces are both planar, thus allowing a clear view through the optics. This feature is preferably preserved in all of the design embodiments provided herein.

Figure 5:
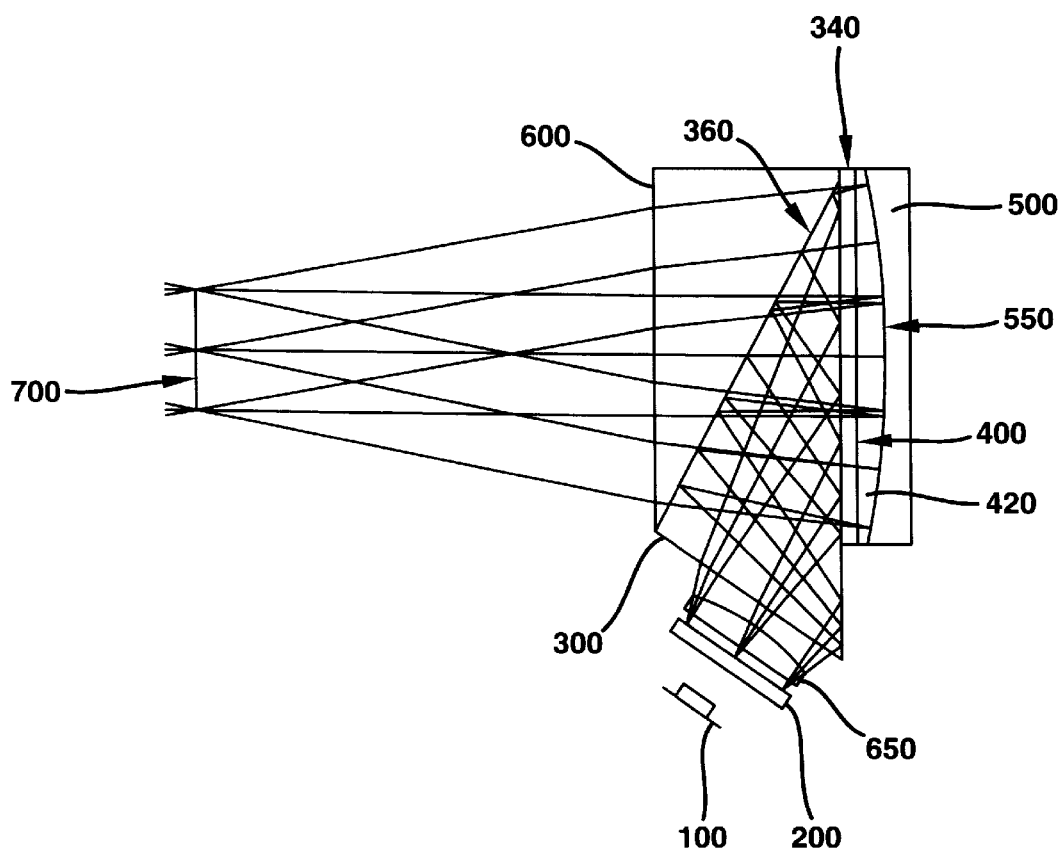
FIG. 5 illustrates a virtual display optical system according to a second embodiment of the present invention.

FIG. 5 illustrates a virtual display optical system according to a second embodiment of the present invention. Particularly, the design of FIG. 5 is similar to the design of FIG. 4, with the exception that a field lens 650 has been incorporated for improved optical performance. The field lens 650 is preferably a field flattening lens, as is well known in the art. However, it is to be appreciated that the addition of one or more further small lenses or other components to improve the overall optical performance features such as, for example, flatness of field or color convergence, will be understood as variations within the scope of the present invention.

Figure 6:
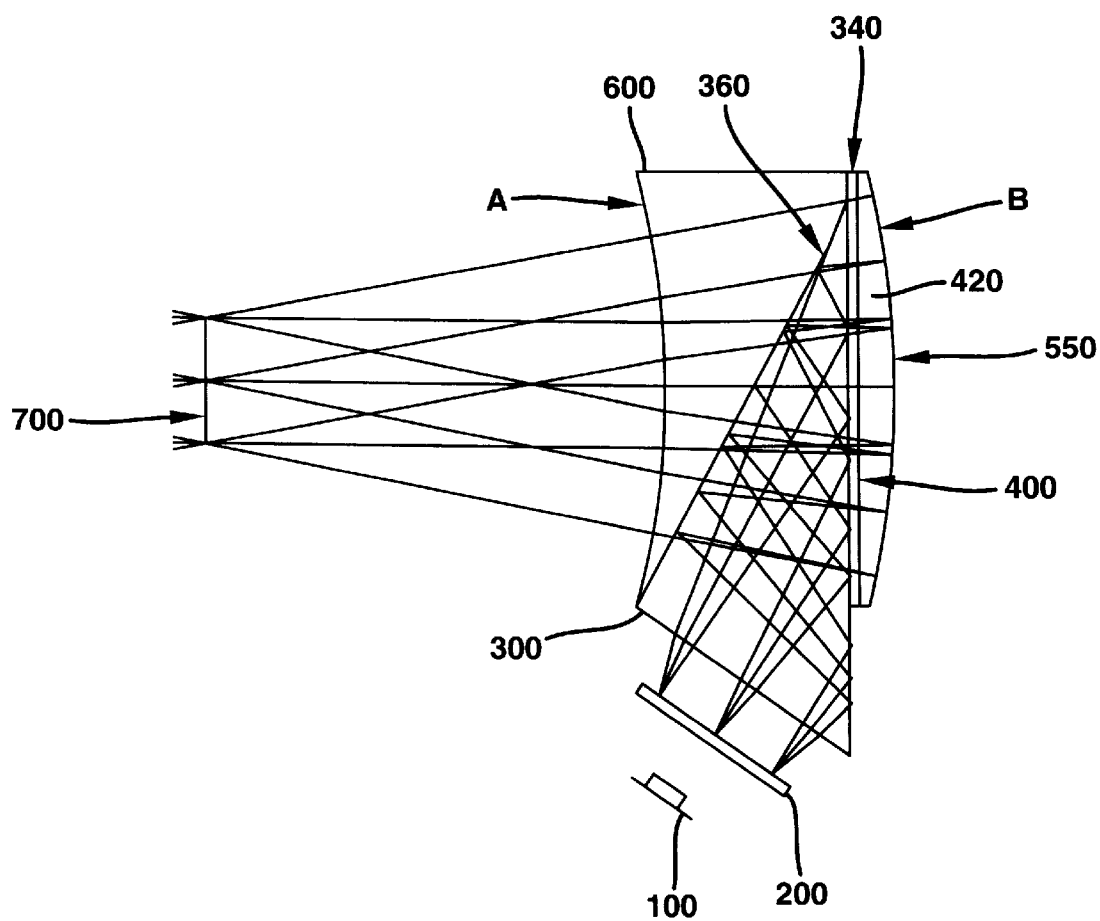
FIG. 6 illustrates a virtual display optical system according to a third embodiment of the present invention.

FIG. 6 illustrates a virtual display optical system according to a third embodiment of the present invention. Particularly, FIG. 6 is similar to the design of FIG. 4, with the exception that the external surfaces of the optical system are curved in a complementary way to preserve an undistorted direct view through the optics, but which allows variation in stylistic appearance. As shown external surface A is formed having a concave shape, while external surface B is formed having a convex shape. In addition, this design has the advantage that it requires fewer elements than the design of FIG. 4, and therefore may be less expensive to manufacture. That is, in the design of FIG. 6, the reflective coating 550 is applied to the exterior surface of the lens 420 resulting in a mirror lens. In this way, a separate reflective lens 500 is not required. It is clear that a field lens could also be incorporated if desired.

Figure 7:
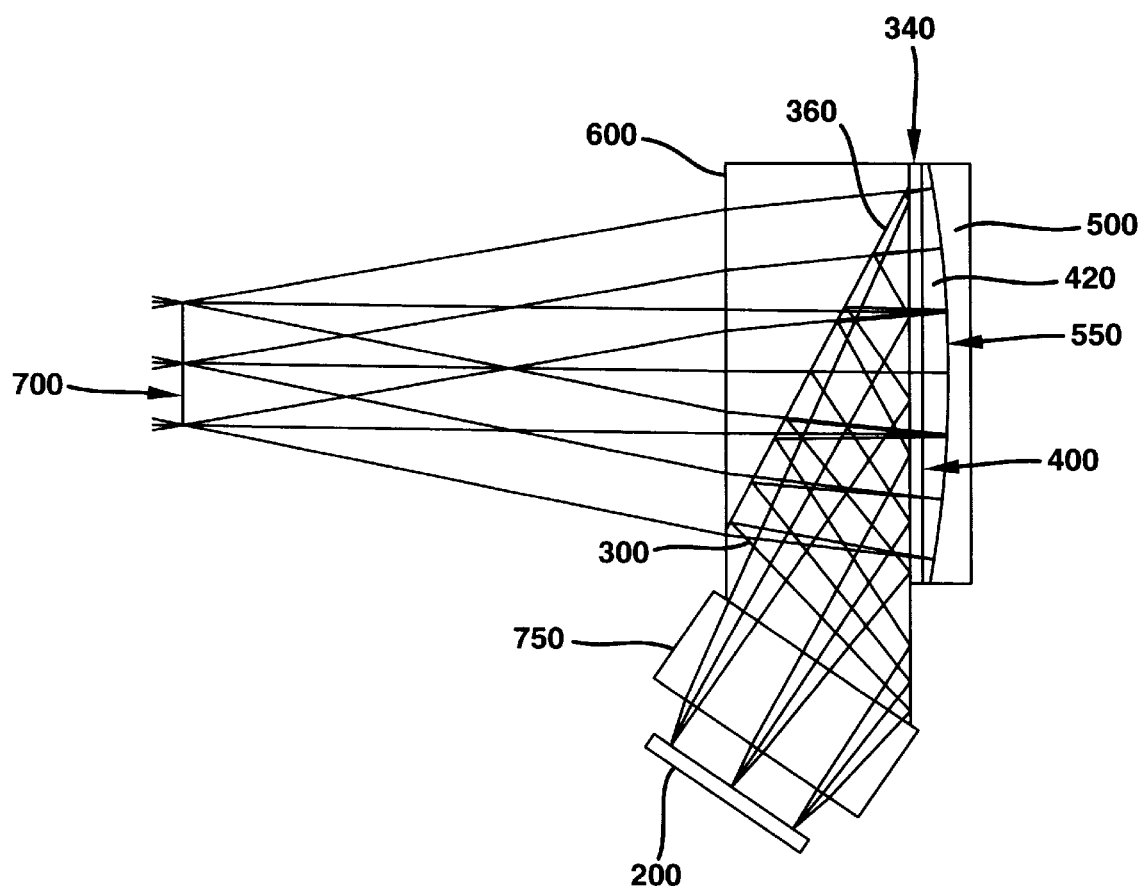
FIG. 7 illustrates a virtual display optical system according to a fourth embodiment of the present invention.

FIG. 7 illustrates a virtual display optical system according to a fourth embodiment of the present invention. Particularly, FIG. 7 shows a variation of the design of FIG. 4 in which a reflective microdisplay such as, for example, a reflective liquid crystal display, is used. Reflective microdisplays that may be used in accordance with the invention are available, for example, from Colorado Microdisplay of Boulder, Colo. Given the fact that a reflective microdisplay is employed, an illumination method is employed that directs light from a light source internal to the illumination system 750 onto the microdisplay and then allows the reflected light to enter the optical system as in FIG. 4. The illumination method is implemented by an illumination system 750. Various conventional illumination methods will be discussed below in the context of FIGS. 12 and 13. A preferred illumination method according to the present invention which may be implemented in illumination system 750 is explained in the context of FIG. 14.

In any case, the rays from the illumination system 750 then follow the path described in the design as shown in FIG. 4. In this way, the advantages of the design of FIG. 4 can be used in conjunction with a reflective type of microdisplay.

Figure 8:
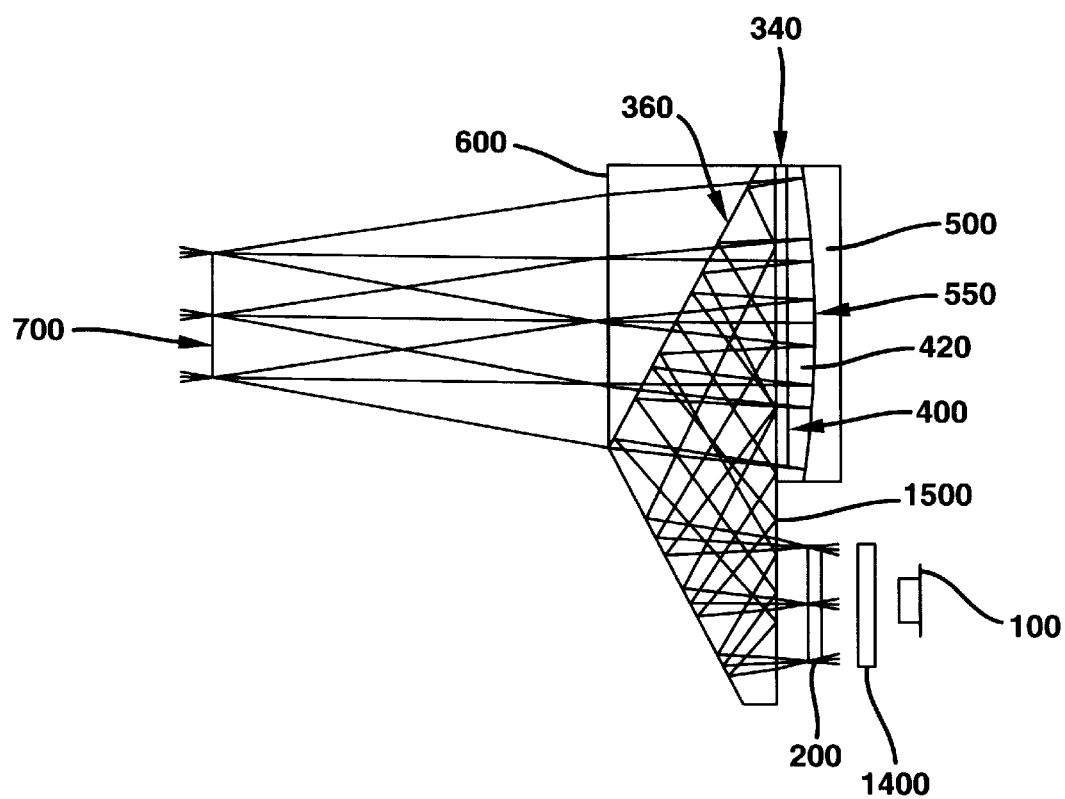
FIG. 8 illustrates a virtual display optical system according to a fifth embodiment of the present invention.

FIG. 8 illustrates a virtual display optical system according to a fifth embodiment of the present invention. Particularly, FIG. 8 shows another method of incorporating a transmissive type microdisplay. Light from light source 100 passes through an illumination system 1400 which may include an illumination lens and diffuser. The light then traverses the transmissive microdisplay 200 and enters a first prism 1500 designed to allow compact folding of the light rays. This is achieved by reflection at the first surface which carries a mirror coating and by virtue of internal reflections, as shown. Internal reflection is ensured by design in that rays to be internally reflected are caused to be incident upon the external surface at an incident angle greater than the critical angle, as is known by those skilled in the art. Rays from this first prism 1500 are then transmitted into the imaging beam splitting prism and lens arrangement as already described in detail with regard to FIG. 4.

Figure 9:
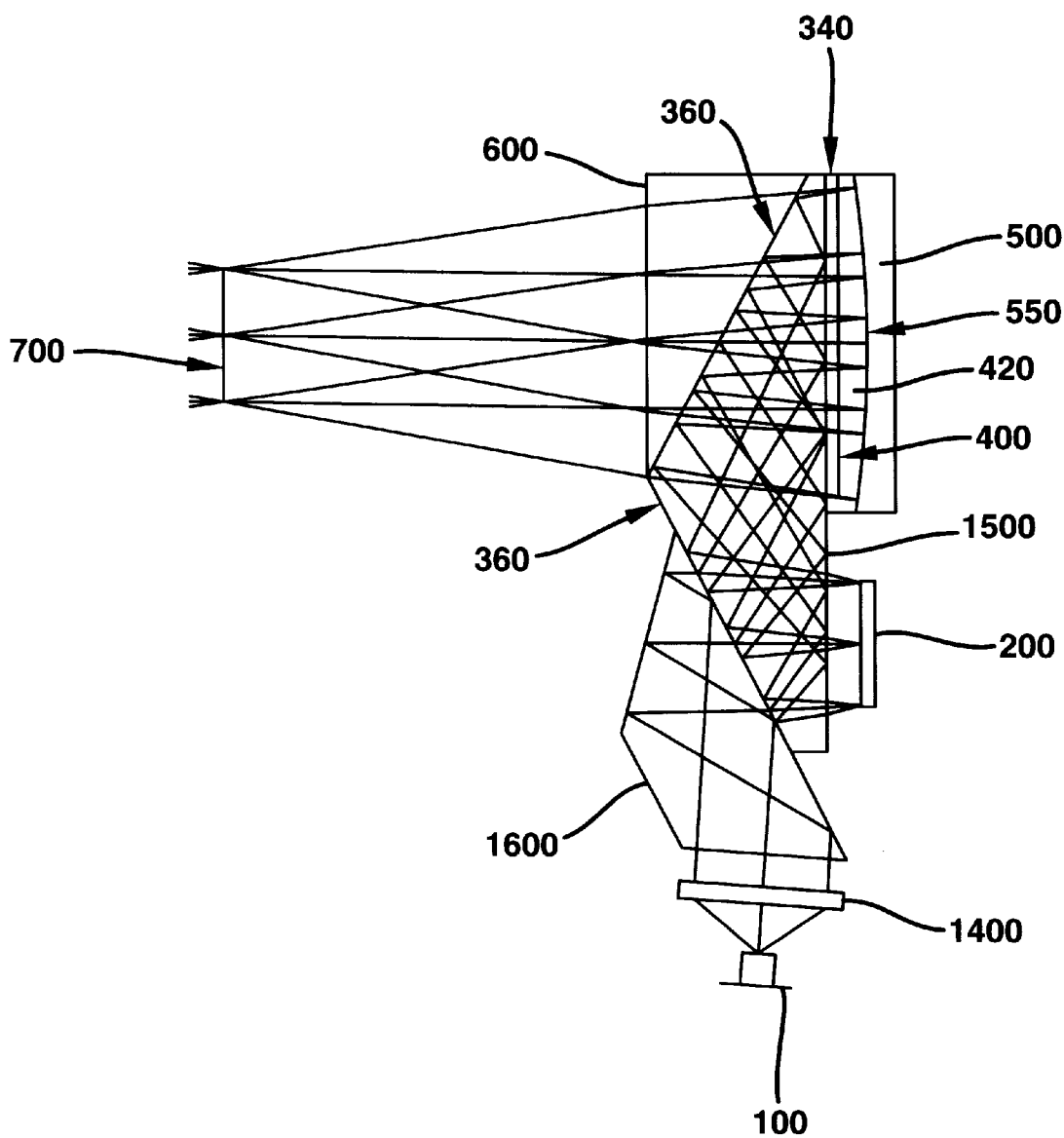
FIG. 9 illustrates a virtual display optical system according to a sixth embodiment of the present invention.

FIG. 9 illustrates a virtual display optical system according to a sixth embodiment of the present invention. Particularly, FIG. 9 shows how the design of FIG. 8 may be adapted to work with a reflective type microdisplay. In this case, a further prism arrangement has been incorporated to provide illumination of a reflection display. Light from the LEDs 100 are focused and diffused as necessary to form a suitable illumination beam. This may be accomplished by lens and diffuser arrangement 1400. This beam enters a lower prism or light pipe 1600 and undergoes a first internal reflection. At the second surface of this lower prism the rays are reflected by a mirror coating. These rays are incident upon the air gap between the illumination and the prism referred to as the first prism 1500 in the description of FIG. 8 and by virtue of the angle of incidence being less than the critical angle these rays are transmitted into the first imaging prism 1500. These rays constituting the illumination beam are reflected by the reflection microdisplay 200 back into the first imaging prism 1500 and are imaged following the manner described in the description for FIG. 8. Additionally, surface 360 of prism 1500 may contain a DBEF film so as to selectively reflect s or p polarized light that is returning from the microdisplay 200. It is to be appreciated that prism 1500 includes the prism referred to as prism 300 of FIG. 4, thus resulting in one single piece of glass as shown in FIG. 8.

Figure 10:
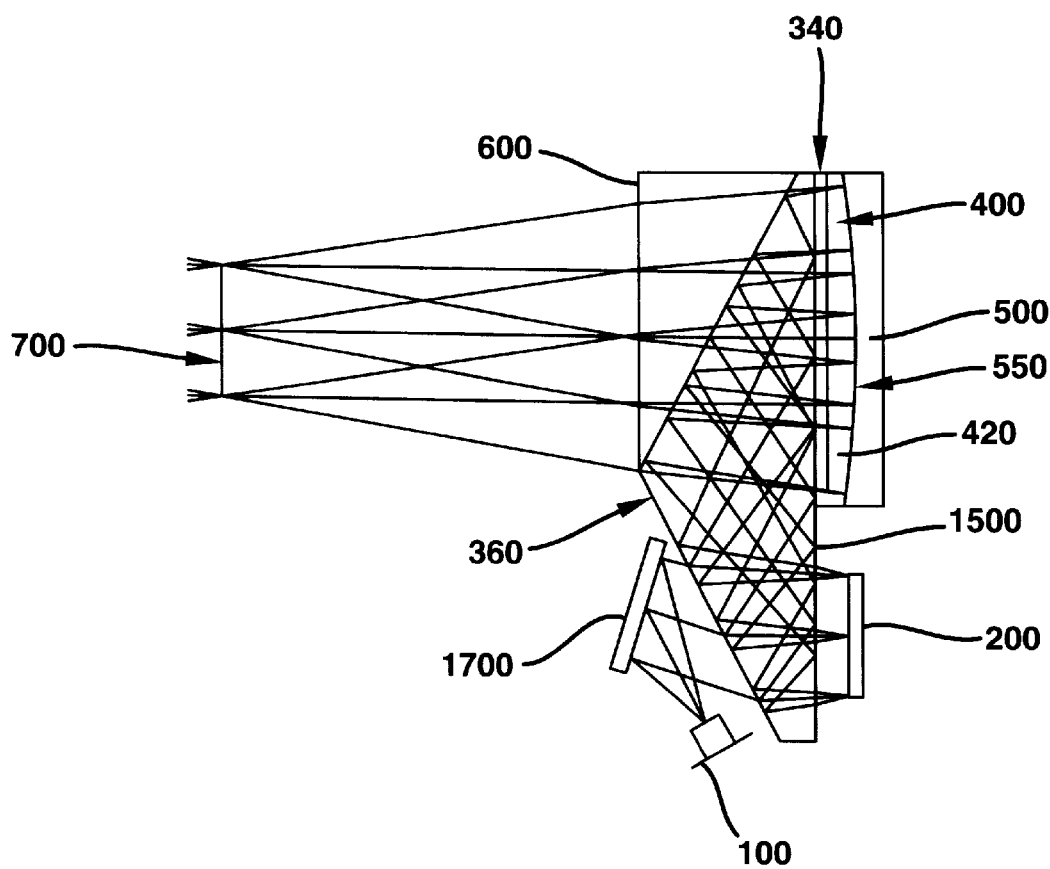
FIG. 10 illustrates a virtual display optical system according to a seventh embodiment of the present invention.

FIG. 10 illustrates a virtual display optical system according to a seventh embodiment of the present invention. Particularly, FIG. 10 shows another method of illuminating the reflective microdisplay shown in the optical design of FIG. 9. In this arrangement, the lower illumination prism 1600 has been replaced by a simple mirror 1700. Light from an LED illumination system is directed upon a suitably placed mirror so that the rays are directed into the first imaging prism 1500 so as to be normally incident upon the microdisplay 200. The reflected rays enter the first imaging prism 1500 and are imaged as described in detail in the context of FIG. 4. It is evident that there are a variety of arrangements that may differ in some detail but which embody the scope of the present invention.

Figure 11:
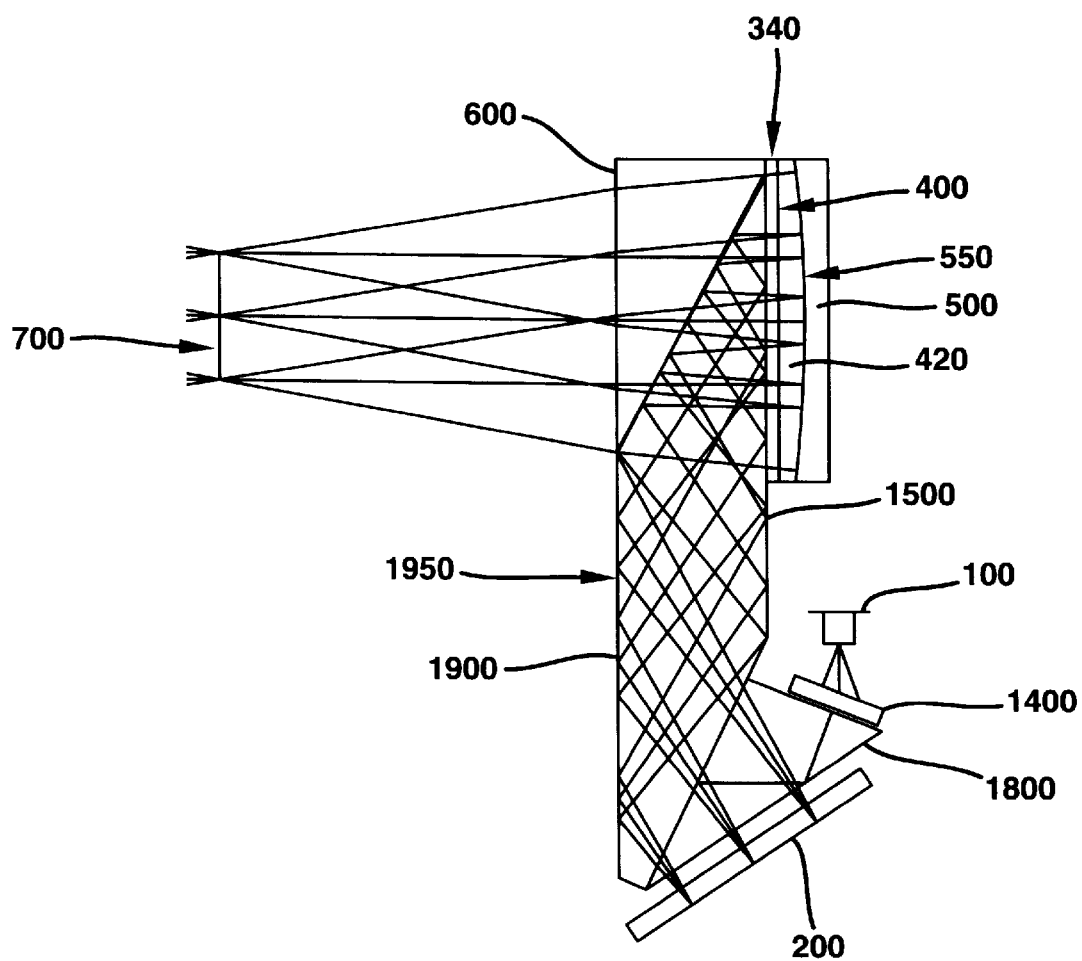
FIG. 11 illustrates a virtual display optical system according to an eighth embodiment of the present invention.

FIG. 11 illustrates a virtual display optical system according to an eighth embodiment of the present invention. Particularly, FIG. 11 shows another optical system whereby folding of the rays by multiple reflections results in a compact slim optical configuration. Light from an illumination system 1400 enters a illumination directing prism 1800 where it undergoes two internal reflections, as shown. These reflections serve to direct the illumination beam normally onto a reflective microdisplay 200. This beam is reflected by the microdisplay 200 and enters the illumination directing prism 1800 but by virtue of its angle of incidence upon the air gap between the illumination directing prism 1800 and a first imaging prism 1900, the beam enters the first imaging prism 1900 instead of being redirected back into the illumination system 1800. As shown, the beam is reflected at a mirrored surface 1950 prior to being introduced into the imaging beam splitting prism 600 and lens arrangement 420, 500 whose function have been described in detail in the context of FIG. 4. It is to be appreciated that prism 1900 includes the prism referred to as prism 300 of FIG. 4, thus resulting in one single piece of glass as shown in FIG. 11.

Illumination System

Recall in the optical system design embodiment of FIG. 7, an illumination unit 750 was employed to direct light from a light source internal to the illumination system 750 onto the microdisplay and then allow the reflected light to enter the optical system as in FIG. 4. In this manner, a reflective type microdisplay can be employed in conjunction with the optical system.

Figure 12:
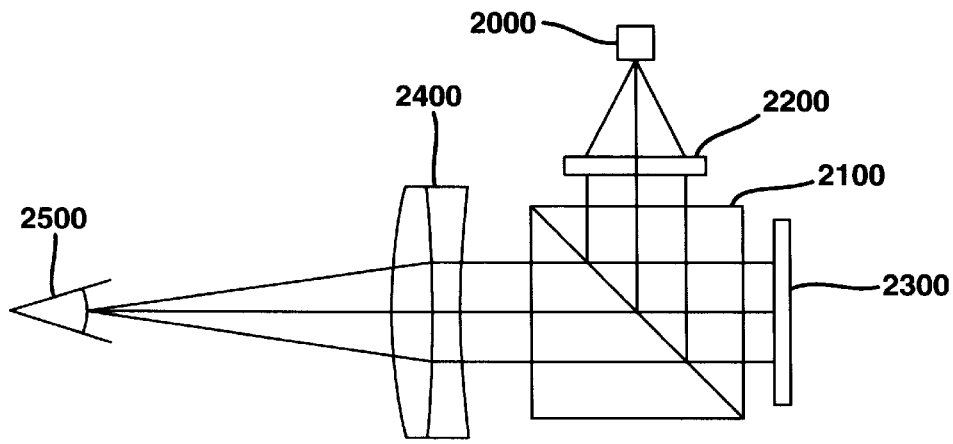
FIG. 12 illustrates an example a known method of illumination of a reflective microdisplay employing a polarizing beam splitter.

There are several conventional illumination systems that may be used with reflective displays. For example, FIG. 12 illustrates an example a known method of illumination of a reflective microdisplay employing a polarizing beam splitter. In FIG. 12, light from a source 2000 such as an LED passes into a polarizing beam splitter cube prism 2100. This beam may be shaped by lenses and diffusers (2200) as desired to provide uniform illumination over the microdisplay 2300. Light of so called s polarization relative to the beam splitter coating is reflected from the coating, while light of so called p polarization is transmitted through according to the known properties of the polarizing beam splitter cube. The s polarized light is allowed to impinge on a liquid crystal microdisplay 2300. When a voltage is applied across the liquid crystal layer of the microdisplay, the light reflected is rotated in the direction of polarization. That is, an s polarized incident light beam is converted fully or partially top polarization upon reflection. The reflected beam in this case being p polarized, is transmitted through the polarization beam splitter coating and enters imaging optics 2400. The beam then passes through the imaging optics 2400 and is directed toward the user's eye 2500. For improved optical contrast a polarizer (not shown) may be used to pre-polarize the light beam from the light source in an s direction, and an analyzer (not shown) may be used in the reflected light path to reject residual light of s polarization. It can be seen that the desirable features of the illumination are to provide even light coverage of the area to be imaged, control of polarization for good optical contrast between light and dark regions in the image, efficient use of available light, and separation between illumination and imaging light paths.

By comparison with transmissive microdisplays, it can be understood that the illumination method introduces additional length into the imaging light path. This makes it more difficult to achieve a desired degree of magnification and increases the size of the overall imaging system. Magnification for a virtual image is commonly referred to in terms of field of view (FOV). The microdisplay shown is placed at a distance from the image forming lens approximately equal to the lens focal length. This ensures that the eye is able to focus an image of the microdisplay onto the retina. The field of view is given by the relation FOV=arctan (w/f), where w is the width of the microdisplay and f is the imaging lens focal length. For a given microdisplay, w is fixed, and for a suitable prism size, the distance between the imaging lens and microdisplay is also fixed. Hence, there is a limit to the FOV attainable. It is possible to achieve a larger value by employing a two stage optical system where a second imaging lens is used to magnify an intermediate image or, alternatively, by a complex retro focus design of the imaging lens. However, it is desirable to avoid resorting to these extreme and costly methods.

Figure 13:
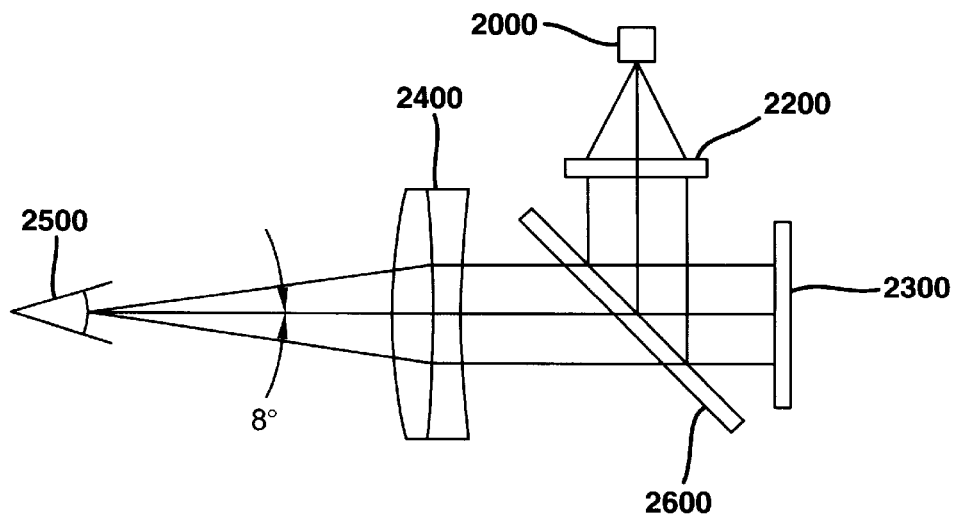
FIG. 13 illustrates an example of a known method of illumination of a reflective microdisplay employing a film of a reflecting, polarizing material known as DBEF.

FIG. 13 illustrates an example of a known method of illumination of a reflective microdisplay employing a film of a reflecting, polarizing material known as DBEF (3M Company, St. Paul, Minn.). This material behaves similarly to a polarizing beam splitter in that light of s polarization is reflected and light of p polarization is transmitted. A plate 2600 carrying a film of DBEF may therefore be used in place of a polarizing beam splitter 2100, as shown. In general, this method provides for reduction in weight but still requires a large path length in the imaging part of the optical system. In addition, the tilted plate may introduce astigmatism into the image. Otherwise, the method of use is as described in FIG. 12. For the geometry shown, the half angle of the FOV is 8 degrees.

Figure 14:
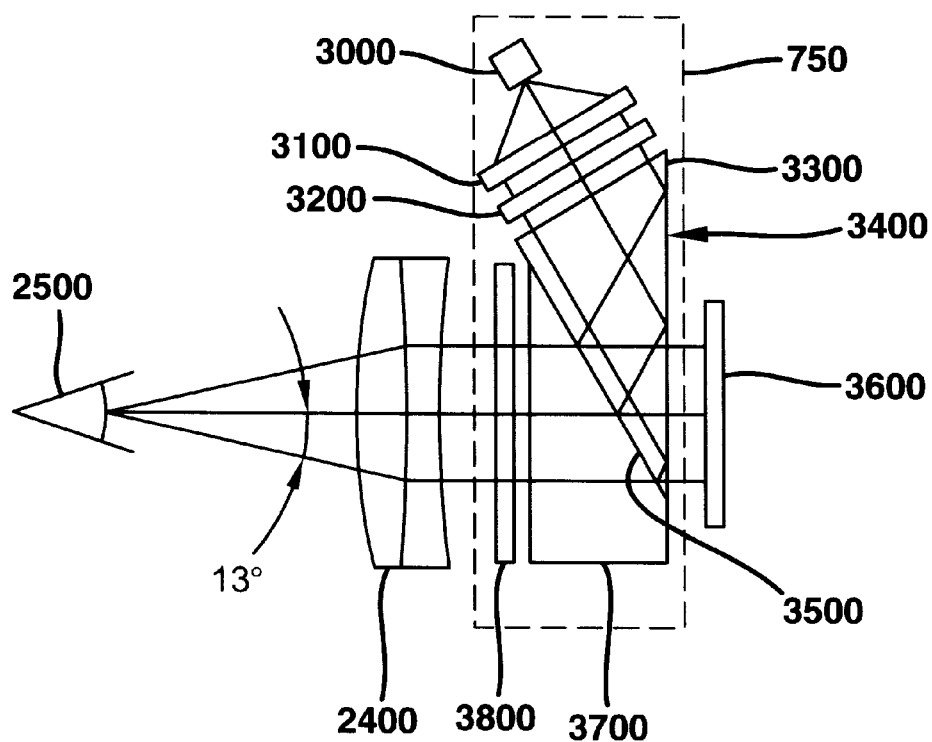
FIG. 14 illustrates an illumination method employing a compact prism with folded light path to provide an improved optical arrangement for virtual displays according to one embodiment of the present invention.

FIG. 14 illustrates an illumination method employing a compact prism with folded light path to provide an improved optical arrangement for virtual displays according to one preferred embodiment of the present invention. Particularly, FIG. 14 shows a new imaging method, which may be employed in the illumination system 750 (FIG. 4), in which the illumination light path is folded to allow for a compact arrangement that has the special advantage of having a shorter light path for the imaging optics. In this case, the half FOV value for the geometry shown is 13 degrees, considerably larger than for the case of FIG. 13.

As shown, the illumination system includes a light source 3000, a lens and diffuser 3100 and a pre-polarizer 3200 that shape and direct the beam from the light source, as is known. The illumination beam enters a folding shallow prism 3300. The beam is first reflected at an air gap 3400 at the surface between the prism and the reflective microdisplay 3600. The beam is then incident on a beam splitting layer 3500 (e.g., DBEF) whereupon the s polarized light is reflected and the p polarized light is transmitted. The transmitted light undergoes a reflection at the upper surface of a second prism 3700 and is directed to be absorbed in a black layer (not shown). The reflected beam is incident normally at the lower surface of the prism 3300 and is so transmitted and is incident upon the reflective microdisplay 3600. Light from the microdisplay 3600 is converted into p polarization in the regions to be imaged, and the p polarized light beam then traverses the illumination prism without hindrance. A post-polarizer 3800 may be included, as shown. However, it is to be appreciated that the polarizer 3800 is necessary only if the DBEF reflective layer 3500 does not provide adequate rejection of the undesired s polarized transmitted light, in which case polarizer 3700 is in effect used as a clean-up polarizer. The reflecting layer 3500 may also be a simpler beam splitting type with some loss in efficiency.

It is to be appreciated that the path length introduced by the illumination prism of FIG. 14 is significantly smaller that in the cases shown in FIGS. 12 and 13. This is a key feature in enabling an advantageous virtual image display of larger field of view with compact optics to be realized.

The rays from the illumination system 750 then follow a path through imaging optics 2400 to the user's eye 2500. It is to be appreciated that the imaging optics may include the design as shown in FIG. 4, as well as other designs provided herein. In this way, the advantages of the design of FIG. 4 can be used in conjunction with a reflective type of microdisplay. This folding prism illumination system has the favorable characteristic that it is compact and requires only a short distance between the display and the final polarizer 3700. It is clear a field lens may also be incorporated if desired.

Advantageously, as explained in detail above, the present invention provides the following exemplary features and benefits: (i) a variety of virtual display systems such as may be used in a head mounted display that provides superior light weight, and comfort; (ii) a virtual display mounted to a boom type of head mounting structure for ease of adjustment, reduction of fatigue, combined with clarity of virtual image; (iii) an improved head mounted display that is unobtrusive to the vision of the user by virtue of the transparent, see-through property of the optical system; (iv) an improved virtual image display that may be worn comfortably by a user in conjunction with eye glasses; (v) an improved head mounted display system that is unobtrusive to the user by virtue of its small size, permitting placement in proximity to the eye without occluding an appreciable part of the field of view; (vi) optical systems that have particular value for achieving high optical performance with transmissive microdisplays combined with light weight and clear see-through properties by virtue of unique beam folding properties; (vii) optical systems that have particular value for achieving high optical performance with reflection light valves combining light weight with clear-see through properties; (viii) optical systems are described incorporating unique methods of illumination of the microdisplay using polarizing reflective film; (ix) optical systems having wide field of view, good eye relief and wide exit pupil; and (x) an illumination method employing a compact prism with folded light path to provide an improved optical arrangement for virtual displays using reflective type microdisplays.

The above features and benefits maybe realized when the invention is combined with the light weight wearable computer system 70 shown in FIG. 3A. It is also to be understood that the optical designs provided herein may also be used advantageously in any portable application requiring a compact light weight virtual image display. Examples are, mobile phones, hand held fax viewers and other devices employing a compact display.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A compact optical system for directing an image signal for viewing by a user, the image signal being generated in accordance with a microdisplay, the system comprising:
    a first prism positioned proximate to the microdisplay;
    a quarter wave plate positioned proximate to the first prism;
    a reflective lens positioned proximate to the quarter wave plate; and
    a second prism positioned proximate to the first prism;
    wherein the first prism, the quarter wave plate, the reflective lens, and the second prism are arranged such that the image signal enters the first prism, reflects at an air gap between the first prism and the quarter wave plate, reflects at a boundary between the first prism and the second prism, passes through the quarter wave plate a first time, reflects at the reflective lens, passes through the quarter wave plate a second time, passes through the boundary between the first prism and the second prism, and exits the second prism for viewing by the user.

2. The optical system of claim 1, wherein the boundary between the first prism and the second prism is configured to reflect polarized light associated with the image signal generated by the microdisplay.

3. The optical system of claim 1, wherein the boundary between the first prism and the second prism includes a multilayer reflective coating.

4. The optical system of claim 1, wherein the boundary between the first prism and the second prism includes a DBEF film.

5. The optical system of claim 1, wherein the reflective lens includes a convex-shaped surface facing the quarter wave plate.

6. The optical system of claim 5, wherein the convex-shaped surface of the reflective lens includes a reflective coating.

7. The optical system of claim 6, wherein the reflective coating is one of a fully reflecting metallic coating, a fully reflecting multilayer dielectric coating, a partially reflecting coating, and a holographic coating.

8. The optical system of claim 6, wherein the reflective coating has a predetermined wavelength associated therewith for permitting substantial reflection of the image signal and substantial transmission of one or more other images.

9. The optical system of claim 1, further comprising a lens positioned between the quarter wave plate and the reflective lens.

10. The optical system of claim 1, further comprising a lens positioned between the microdisplay and the first prism.

11. The optical system of claim 10, wherein the lens is a field flattening lens.

12. The optical system of claim 10, wherein the lens is a color convergence lens.

13. The optical system of claim 1, wherein the microdisplay is an emissive type microdisplay.

14. The optical system of claim 1, wherein the microdisplay is a transmissive type microdisplay.

15. The optical system of claim 1, wherein the microdisplay is a reflective type microdisplay.

16. The optical system of claim 14, further comprising an illumination device positioned proximate to the reflective microdisplay for directing light toward the reflective microdisplay prior to the image signal entering the first prism.

17. The optical system of claim 1, further comprising a first prism proximate to a microdisplay, such that the image signal reflects at a first surface of the first prism reflects at a second surface of the first prism, at the air gap between the first prism and the quarter wave plate, reflects at the layer at the boundary between the first prism and a second prism, passes through the quarter wave plate, reflects at a convex mirror surface, passes a second time through the quarter wave plate and exits at a concave external surface of the second prism.

18. The optical system of claim 17, wherein an incident angle of the image signal at the external surface being greater than a critical angle.

19. The optical system of claim 17, further comprising an illumination lens and diffuser positioned between a light source and the microdisplay.

20. The optical system of claim 17, further comprising a third prism positioned proximate to the first prism such that light from a source enters the third prism, reflects at first and second surfaces of the third prism and exits the third prism, traverses the first prism for subsequent reflection at the microdisplay.

21. The optical system of claim 17, further comprising a mirror positioned proximate to the first prism such that light from a source reflects at the mirror and traverses the first prism for subsequent reflection at the microdisplay.

22. The optical system of claim 1, further comprising a third prism positioned proximate to the first prism such that light from a source enters the third prism, reflects at first and second surfaces of the third prism and exits the third prism, reflects at the microdisplay, and traverses the first prism for subsequent reflection toward the user.

23. The optical system of claim 1, wherein the system is incorporated in a virtual image display unit.

24. The optical system of claim 23, wherein the virtual image display unit is head mountable.

25. The optical system of claim 1, wherein outer surfaces of the second prism and the reflective lens are suitably shaped such that the user has an undistorted view of the surrounding external environment.

26. A compact optical system for directing an image signal for viewing by a user, the image signal being generated in accordance with a microdisplay, the system comprising:
    a first prism positioned proximate to the microdisplay;
    a quarter wave plate positioned proximate to the first prism;
    a reflective lens positioned proximate to the quarter wave plate, the reflective lens including a convex-shaped external surface; and
    a second prism positioned proximate to the first prism, the second prism including a concave-shaped external surface;
    wherein the first prism, the quarter wave plate, the reflective lens, and the second prism are arranged such that the image signal enters the first prism, reflects at an air gap between the first prism and the quarter wave plate, reflects at a boundary between the first prism and the second prism, passes through the quarter wave plate a first time, reflects at the reflective surface, passes through the quarter wave plate a second time, passes through the boundary between the first prism and the second prism, and exits the second prism for viewing by the user.

27. The optical system of claim 26, wherein the surface of the reflective lens has a predetermined wavelength associated therewith for permitting substantial reflection of the image signal and substantial transmission of one or more other images.

28. A head mounted virtual image display unit, the unit comprising:
    a microdisplay;
    an optical system for directing an image signal for viewing by a user, the image signal being generated in accordance with the microdisplay, the optical system including: (i) a first prism positioned proximate to the microdisplay; (ii) a quarter wave plate positioned proximate to the first prism; (iii) a reflective lens positioned proximate to the quarter wave plate; and (iv) a second prism positioned proximate to the first prism, wherein the first prism, the quarter wave plate, the reflective lens, and the second prism are arranged such that the image signal enters the first prism, reflects at an air gap between the first prism and the quarter wave plate, reflects at a boundary between the first prism and the second prism, passes through the quarter wave plate a first time, reflects at the reflective lens, passes through the quarter wave plate a second time, passes through the boundary between the first prism and the second prism, and exits the second prism for viewing by the user; and
    an optical system mounting structure for supporting the optical system within the field of view of an eye of the user.

29. The head mounted virtual image display unit of claim 28, wherein the mounting structure is configured to permit the optical system to be selectively moved into and out of the field of view of the eye of the user.

30. A portable computer system, comprising:
    (a) a head mounted virtual image display unit, the unit including:
        a microdisplay;
        an optical system for directing an image signal for viewing by a user, the image signal being generated in accordance with the microdisplay, the optical system including: (i) a first prism positioned proximate to the microdisplay; (ii) a quarter wave plate positioned proximate to the first prism; (iii) a reflective lens positioned proximate to the quarter wave plate; and (iv) a second prism positioned proximate to the first prism, wherein the first prism, the quarter wave plate, the reflective lens, and the second prism are arranged such that the image signal enters the first prism, reflects at an air gap between the first prism and the quarter wave plate, reflects at a boundary between the first prism and the second prism, passes through the quarter wave plate a first time, reflects at the reflective lens, passes through the quarter wave plate a second time, passes through the boundary between the first prism and the second prism, and exits the second prism for viewing by the user; and
        an optical system mounting structure for supporting the optical system and microdisplay within the field of view of an eye of the user; and
    (b) a computer-based device, coupled to the head mounted virtual image display unit, for generating and providing an electrical signal to the microdisplay for use in generating the image signal to be viewed by the user.

* * * * *